United States Patent [19]

Zwirn et al.

[11] Patent Number: 4,789,898
[45] Date of Patent: Dec. 6, 1988

[54] DEMAND AUTO FOCUS DRIVEN BY SCENE INFORMATION ONLY

[75] Inventors: Robert Zwirn, Los Angeles; Michael Thomas, Inglewwod, both of Calif.

[73] Assignee: Hughes Aircraft Company, Los Angeles, Calif.

[21] Appl. No.: 145,167

[22] Filed: Jan. 19, 1988

[51] Int. Cl.⁴ .......................................... H04N 5/232
[52] U.S. Cl. ................................... 358/227; 250/201
[58] Field of Search ............... 358/227, 225; 250/201, 250/204; 354/400

[56] References Cited

U.S. PATENT DOCUMENTS

| | | |
|---|---|---|
| 4,381,923 | 4/1983 | Eguchi et al. ........................ 358/227 |
| 4,382,665 | 5/1983 | Eguchi et al. ........................ 358/227 |
| 4,422,097 | 12/1983 | Inviya ................................. 358/227 |
| 4,591,919 | 5/1986 | Kaneda et al. ....................... 358/227 |
| 4,635,124 | 1/1987 | Andreatti, Jr. et al. ............. 358/227 |
| 4,647,979 | 3/1987 | Urata .................................. 358/227 |

*Primary Examiner*—Jin F. Ng
*Assistant Examiner*—Stephen Brinich
*Attorney, Agent, or Firm*—Ronald L. Taylor; W. J. Streeter; A. W. Karambelas

[57] ABSTRACT

A demand auto focus system is driven by scene information only, In a scanned video system as the camera is brought into focus the high frequency content of the video signal will increase. The video signal is passed through a band-pass filter and then rectified in a conditional integrator to generate a control signal whose amplitude indicates to the degree of focus. The control signal is stored and later compared to a control signal derived from a subsequent scanning. Once a significant change in control signal levels is deteced a drive signal is sent to the focusing device. If after being driven the subsequent scene has less high frequency content, then a drive signal in the opposite polarity or direction is sent to the focusing device. In this manner the scene is toggled toward optimum focus. When rapid toggling occurs a number of times (three for example), control logic detects this condition which is symptomatic of hunting around optimum focus, and the bidirectional focusing mechanism drive is turned off until such time as the scene becomes so defocused as to reinitiate the focusing sequence.

15 Claims, 8 Drawing Sheets

MOTOR DIRECTION CONTROL

DEMAND AUTO FOCUS DRIVEN BY SCENE INFORMATION ONLY

BACKGROUND OF THE INVENTION

The present invention relates generally to the field of automatic focusing systems and more particularly to the field of automatic focusing systems driven by scene information.

In the prior art there exist automatic focusing systems driven by active range finding devices such as sonar, radar, and laser range finders. Such systems give the subject of the focusing a ready means for detecting that it is under observation. Further, such systems require additional devices and components which increase the burdens of weight, size and power consumption while decreasing overall system reliability. The range information is used to compute where the lens should be while the additional devices and components are required to indicate where the lens actually is and to move it to where computations indicate it should be.

Also in the prior art there exists automatic focusing servomechanism systems that continuously keep a scene in focus. However the continuous fine tuning of these devices are relatively hard wearing on the focusing mechanisms and require upgraded components in these areas. If in order to save power, reduce wear and tear, or reduce the annoyance of continuous fine tuning, the focusing system is pulsed or manually shut off, then there exists the possibility (if not probability) that the object under focus may move out of focus during the off period.

Therefore it is an object of the present invention to provide a non emitting automatic focusing system.

It is another object of the present invention to provide an automatic focusing system which is driven by scene information.

It is yet another object of the present invention to provide an automatic focusing system which is driven by scene information only regardless of the cause of the defocus, be it range variation, thermal expansion or compression of the lens securing structure, variation of the index of refraction with temperature, or any other cause.

It is still yet another object of the present invention to provide a demand auto focus system which is driven by scene information to activate focusing mechanisms only when the image has moved out of focus.

SUMMARY OF THE INVENTION

To achieve the foregoing and other objects, and in accordance with the purposes of the present invention, as embodied and broadly described herein, the apparatus of this invention may comprise a demand auto focus system driven by scene information only, particularly information relating to the high frequency spectral density of the scene.

In a scanned video system the video signal will have a bandwidth that is related inter alia to the degree of focus of the system camera or other video information gathering device. As the video information gathering device is brought into focus the high frequency content of the video signal will increase. By passing the video signal through a band pass filter and then processing it in a conditional integrator, a control signal is generated whose amplitude contains information relating to the degree of focus.

The control signal is stored and later compared to a control signal derived from a subsequent scanning. Once a significant change in control signal levels is detected a drive signal is sent to the focusing device. If after being driven the subsequent scene has less high frequency content, then a drive signal in the opposite polarity or direction is sent to the focusing device. In this manner the scene is toggled into focus only when the scene is initially defocused.

In a scanned video system, horizontal, vertical, and other video control information signals are generated. The present invention uses these available control signals to provide timing and synchronization for the sampling, holding, and comparing of the control signals.

In one embodiment of the invention the focusing device is a small motor geared to control the position of a camera lens.

The present invention of a scene driven demand auto focus system for tuning a bidirectional focusing mechanism controlling the focus of a video image of a scene may also comprise circuits for receiving periodic video images of a scene and for deriving an indication of the high frequency content of each periodic image received. The circuits receive the derived indication and compare the derived indication of one received video image with the derived indication of a previously received sample and generate a first drive signal if the derived indication of the previously received video image is lower than said indication of said recently received video image by at least a certain amount. The circuits generate a second drive signal if the derived indication of the previously received video image is not lower than the derived indication of the recently received video image by at least a certain amount. Control circuits receive the first and second drive signals and accelerate the bidirectional focusing mechanism whenever the first drive signal is received and reverses the direction of travel, establishes a minimum velocity and accelerates the bidirectional focusing mechanism each time the second drive signal is received. Thus the bidirectional focusing mechanism is toggled in the direction indicated to increase said derived indication of the periodically received video images which is the direction of increased focus. When rapid toggling occurs consecutively a number of times (three for example), control logic detects this condition which is symptomatic of hunting around optimum focus, and the bidirectional focusing mechanism drive is turned off until such time as the scene becomes so defocused as to reinitiate the focusing sequence.

One advantage of the present invention is that the focusing mechanism is passively activated in that it does not require the addition and generation of sonar, radar, or laser signals for range detection.

Another advantage of the present invention is that the automatic focusing mechanism is driven only upon demand and is not continuously fine tuning the focus, thereby reducing wear and tear on the focusing devices.

Still yet another advantage of the present invention is that it is readily adaptable to replace manual tuning of existing focusing mechanisms.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DESCRIPTION OF THE PREFERRED EMBODIMENT

Figure 1:
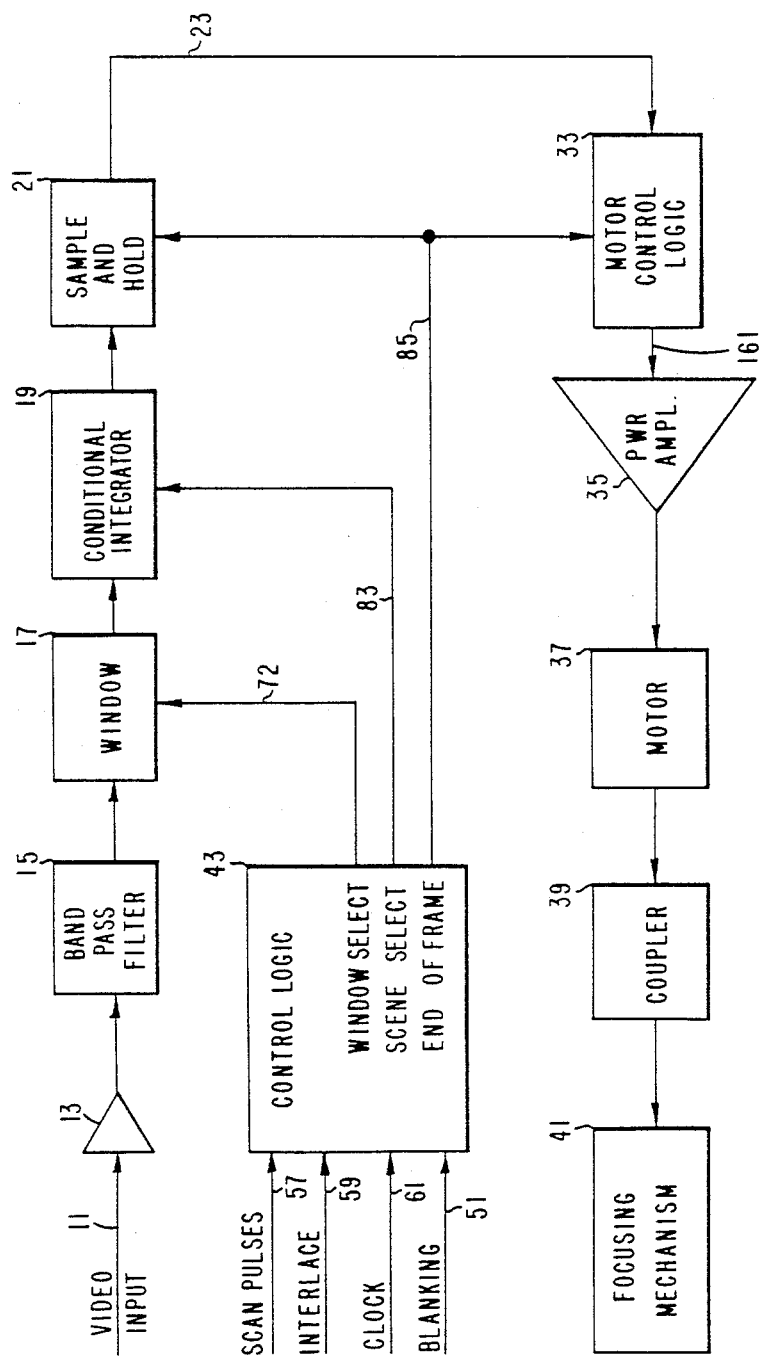
FIG. 1 is a block diagram of an embodiment of present scene information driven demand auto focus invention.

The operation of the present invention may be seen with reference to FIG. 1 which is a block diagram of one embodiment of the present invention. A video signal is inputted on line 11 to input buffer 13. The video signal is an electronic image of the scene under focus and is in essence like the video signal of a television system. In one embodiment of the invention, the video signal on line 11 is the processed output of a video camera (not shown).

The video signal on line 11 follows Hartley's law which states that the amount of bandwidth required by a signal is proportional to the amount of information that it contains divided by the time of transmission. Since the transmission time is constant for all samples, it is clear that a well focused sharp scene contains more information and hence requires a higher bandwidth than a fuzzy out-of focus scene. Thus the high frequency spectral density of the video signal of a scene is an indication of the degree of focus of that scene. By comparing the amount of high frequency components of one sample of a scene to an earlier sample, one can tell whether the direction of the focusing mechanism is correct or reversed.

The video signal on line 11 is sent to buffer 13 (if needed). The output of the buffer 13 is sent through a band pass filter 15, a window 17, a conditional integrator 19, and a sample and hold circuit 21 to motor control logic 33. The band pass filter 15 may be a simple resistor-capacitor filter but a more sophisticated embodiment could also be used. The low frequency cut-off is nominally in the area of 50 Hertz and the filter should be usable up to over 4 megaHertz or so depending on the resolution of the focusing devices. Above this high frequency cut off gain is reduced to suppress noise.

Once the video signal is passed through the band pass filter 15, it passes through a window 17 which functions as an analog gate to pass only a selected portion of the video signal. The reasons for doing this and apparatus for implementing the window 17 will be detailed after completing a general discussion of the operation of the present invention as shown in FIG. 1.

The conditional integrator 19 may be a simple diode connected in series with a resistor and a relately large grounded capacitor for integrating the signal from the band pass filter 15 on the condition that it exceeds the stored integrated output. The conditional integrator 19 functions mainly to convert the signal passing through the window 17 from a high frequency signal to a DC measure, which DC measure is related to the high frequency spectral density of the signal received.

The DC measure developed in the conditional integrator 19 is periodically sampled and held in sample and hold circuit 21. The output of the sample and hold circuit 21 is supplied on line 23 to motor control logic 33.

The motor control logic 33 compares the most recent sample from the sample and hold circuit 21 with the previous sample to generate a difference signal representing the difference between the two samples. A drive signal is sent to focussing motor 37 through power amplifier 35. The motor control logic 33 also uses the polarity of the difference signal to determine the direction to drive the motor 37. If the difference signal indicates that the most recent sample from the sample and hold circuit 21 is larger than the previous sample, the motor is driven in the same direction that it was driven last time; otherwise, the motor direction is toggled. In this manner the motor 37 is driven in the direction tending to increase the high frequency content of the video signal on line 11 thereby increasing the sharpness of focus. The motor control circuit 33 also includes important circuitry which shuts down the motor drive signals when scene under focus is cycling through optimum focus. A complete detailing of the motor control logic 33 will follow completion of a more general description of the operation of the present invention as shown in FIG. 1.

Coupling mechanism 39 is provided as needed between the motor 37 and the focusing mechanism 41. The focusing mechanism 41 may function merely to change the focal length on a camera (not shown). The focusing mechanism 41 may also preferably permit a manual control or override for initial focusing or whenever desired. Alternatively, manually controlled electrical signals may be inputted to either the motor control logic 33 or the power amplifier 35 to permit manual override.

Figure 2:
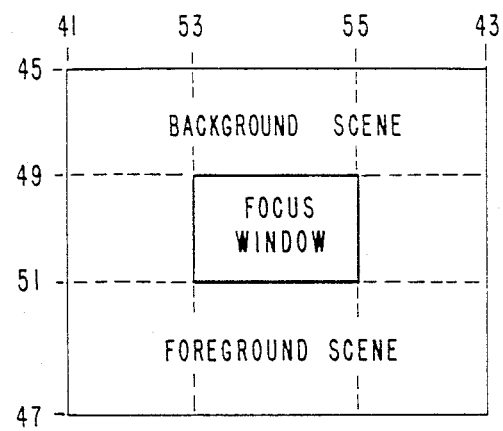
FIG. 2 is a diagram illustrating the scene under focusing and the positioning of a focus window within scene.

Before further discussion concerning the operation and details of the present demand auto focus invention, it will be beneficial to examine the various considerations and parameters of exactly what it is that is to be focused, see FIG. 2. Consider a video image extending horizontally from left edge 41 to right edge 43 and vertically from the top edge 45 to the bottom edge 47. At the bottom between the bottom window edge 51 and the bottom edge 47 lies the foreground scene. At the top between the top edge 45 and the top window edge 49 lies the background scene. As may be appreciated, the background scene lies relatively far from camera or device receiving the video image and the foreground scene lies relatively near. In order to focus only on areas of interest, a focus window is formed bounded by the top window edge 49, and the bottom window edge 51. In order to avoid foreground clutter the focus window is bounded by the left window edge 53 and the right window edge 55.

The video image of FIG. 2 may be derived in many ways as is well known in the art. For example, the video image may be "painted" in horizontal lines from left to right and from top to bottom as is done in broadcast TV. Conversely, the image may be "painted" in vertical lines. In either case, with the conventional horizontal and vertical synchronization signals provided, it is easy to blank out all but the focus window by gating the video image through only during the time periods when the video image is in the focus window formed by window edges 49, 51, 53, and 55.

Figure 3:
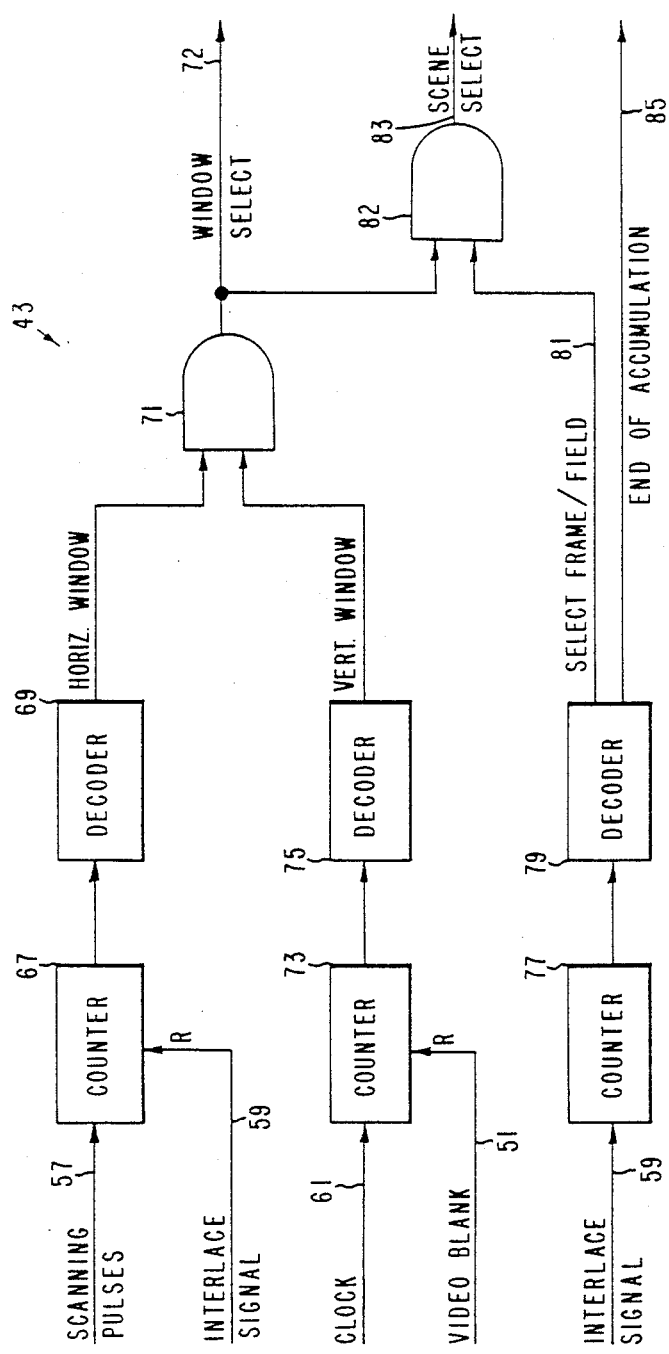
FIG. 3 is a logic diagram of control logic for use in generating the focus window shown in FIG. 2.

FIG. 3 is a block diagram of control logic 43 illustrating how to use the typical image control pulses present with a video signal to provide a focus window. In a scanned video system horizontal, vertical, and other video control information signals are generated. The present invention uses these available control signals to provide timing, synchronization and scene selection. Common scanning signals are the scanning pulses, the interlace signal, a clock, and a video blanking signal. These signals are inputted to control logic 43 on input lines 57, 59, 61 and 51 respectively. Among the timing and sychronizing signals generated by the control logic 43 are the window select signal on line 72, the scene select signal on line 83 and the end of frame signal on line 85.

With continued reference to FIG. 3, it can be appreciated that a complete frame may be scanned (as is broadcast TV) every odd line first followed by a scanning of even lines to permit a flicker free presentation of a scene at a slower scanning rate than would be possible had all lines been scanned sequentially. Between the odd line scans and the even line scans an interlace signal is generated. By using a counter 67 to count the pulses on the scanning pulse line 57 and by resetting the counter with the signal on the interface line 59 a count is derived indicating directly the horizontal positioning of the scene being scanned. A decoder 69 following the counter 67 outputs a logical one to AND gate 71 for those counts indicating a scanning position within the horizontal focus window; i.e., within horizontal window edge lines 53 and 55 of FIG. 2. Decoder 69 may be settable or programmable to adjust the horizontal focus window size.

Likewise clock pulses on the clock line 61 are counted by a counter 73 which is reset by a pulse on the video blanking line 63. Thus a count is generated indicating the vertical position of the scene being scanned. A decoder 75 following the counter 73 outputs a logical one to AND gate 71 for those counts indicating a scanning position within the vertical focus window; i.e., within vertical window edge lines 49 and 51 of FIG. 2. Decoder 75 may be settable or programmable to adjust the vertical focus window size. The output of the decoders 69 and 75 are combined in AND gate 71 which sends a window select signal out on line 72.

In similar fashion the interlace pulses on interlace line 59 are counted by counter 77 and decoded by decoder 79. By counting a number of interlace pulses and outputting a logical one signal on the select frame/field line 81 of the decode 79 a control can be fed through AND gate 82 and over the scene select line 83 so that 3 sequential scenes (or any other selectable number of scenes) are selected as indicated by a logical one on scene select line 83. The advantage of doing this will be discussed below. Decoder 79 also outputs a signal on end-of-accumulation line 85 to indicate the end of the selected scenes.

The purpose and functioning of the control logic 43 detailed in FIG. 3 is revealed by returning to FIG. 1. The window select signal on line 72 controls an analog gate designated as window 17 to pass the output of the band pass filter 15 to the conditional integrator 19 only during the period when the video input 11 is in the window hence eliminating focusing on the foreground or background of a scene.

The scene select signal on line 83 controls the conditional integrator 19 so that it is only periodically reset. In this fashion a number of frames are integrated and the effect of noise or disturbance during any one frame is reduced. For example, nine frames may be integrated and the tenth reset. If the reset occurs too frequently insufficient noise is integrated out whereas if the integration period is too long the overall focusing process is slowed. Since the overall focusing process involves a relatively high speed video input and a relatively slow speed mechanical focusing output, some period of integration will be beneficial.

The end-of-accumulation signal on line 85 occurs at the end of the frame prior to the resetting of the conditional integrator 19. In this manner the integrated signal of the conditional integrator 19 is dumped into the sample and hold circuit 21 and the motor control logic 33 is notified that new data is available for motor control.

Figure 4:
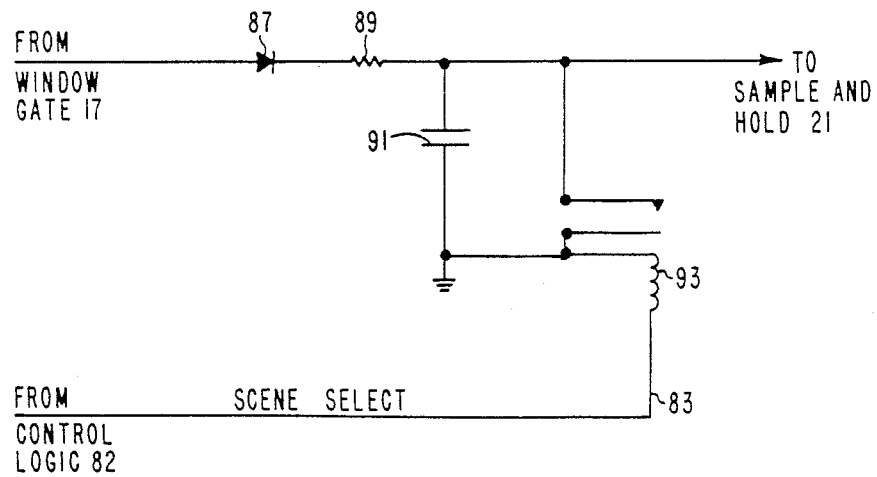
FIG. 4 is a schematic illustrating the operation of the positive half of a conditional integrator used in the embodiment of FIG. 1.

Details of the positive half of the conditional integrator 19 are shown in FIG. 4. Signals received from the window gate 17 are rectified in diode 87 and integrated in an RC integrator comprising resistor 89 and capacitor 91. The rectified signal charges up the capacitor 91 which is periodically discharged in mid field after the window by a signal on the scene select line 83 which energizes relay 93. This occurs after the sample and hold circuit acquires the integrated signal at the beginning of the same field as commanded by the end-of-accumulation signal 85.

Relay 93 is shown as a mechanical relay for illustrative purposes only and would most likely be implemented in solid state form. Furthermore, it is obvious that the diode 87, resistor 89, and capacitor 91 could be duplicated with the diode 87 reversed to store negative values from the window gate 17. The positive and negative stored values could be fed to a differential amplifier (not shown) to output a signal to the sample and hold circuit 21.

Prior to the discharging of the capacitor 91 in the conditional integrator 19 the value of the capacitor is read into the sample and hold circuit 21 and from thence into the motor control logic 33. Within the motor control logic 33 the analog signal on the sample and hold output line 23 is fed to a pair of comparators 95 and 97, see FIG. 5. The comparators 95 and 97 compare the present output 23 of the sample and hold circuit 21 with the previous output. If sufficient difference exists a signal is sent through OR gate 98 to set flip-flop 101 and provide a signal on the motor start command line 103. This signal on line 103 will start motor 37 if it was stopped as will be detailed later.

Figure 5:
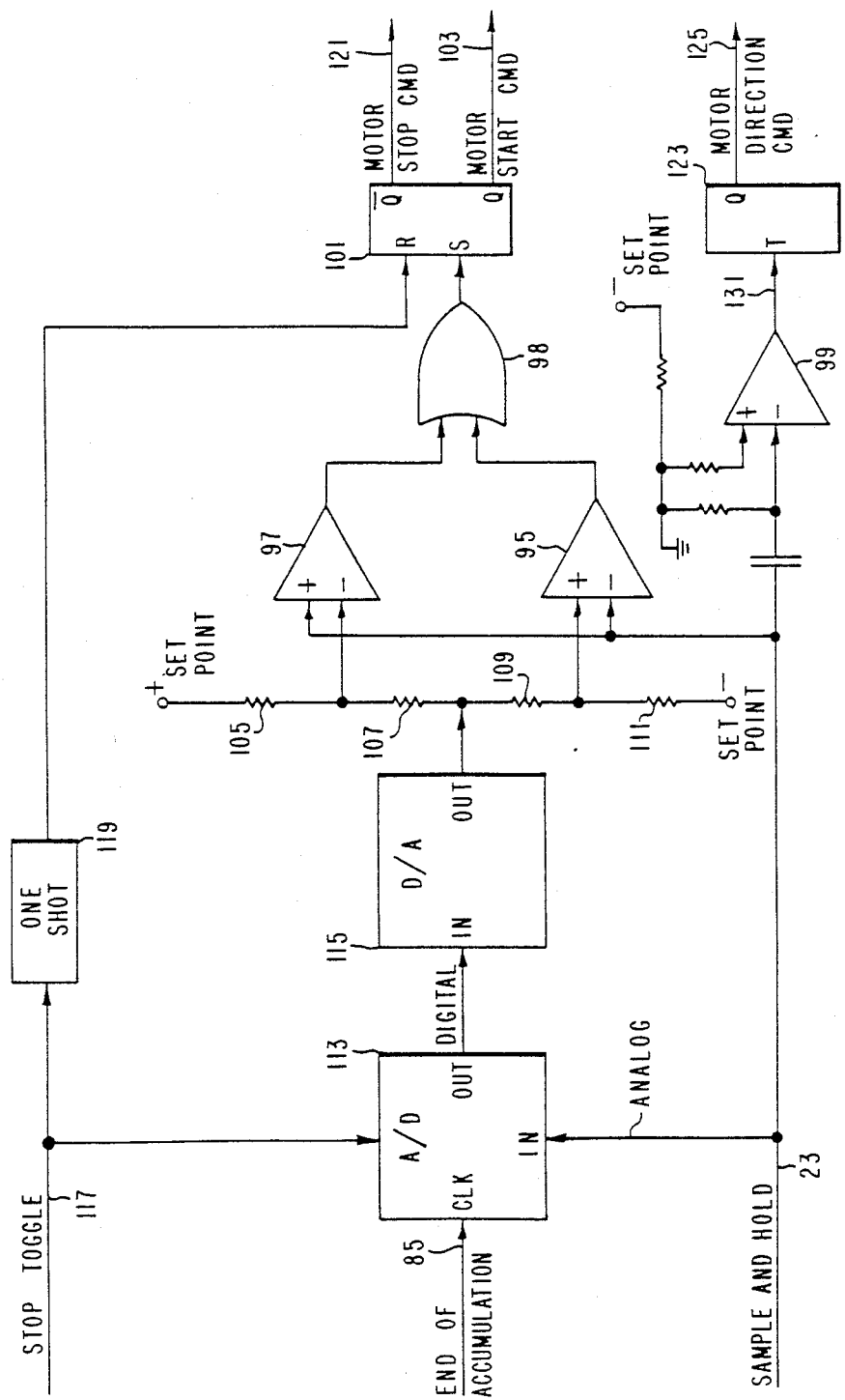
FIG. 5 is a block diagram of logic circuits used in the motor control logic of FIG. 1 to toggle the focusing mechanism in a manner to sharpen focus.

The amount of difference between the prior sample and the present sample required to start motor 37 is determined by the values of the positive and negative set point levels and resistors 105, 107, 109 and 111 shown in FIG. 5. The advantage of having a difference threshold is that the motor 37 is not continually running as would be the case otherwise. The difference threshold is set as desired to provide a motor restart band which is penetrated if the degree of focus is deemed to be "poor enough" to restart toggling.

The comparators 95 and 97 compare the present value of the sample and hold value on line 23 with the last value prior to the motor being stopped. That last value had been fed into analog-to-digital converter 113 and from thence to the digital-to-analog converter 115 to provide an input between resistors 107 and 109. The analog-to-digital converter 113 reads the value on the sample and hold line 23 every time a signal appears on the end of the accumulation line 85 unless a stop signal is present in stop line 117. When a stop signal appears on line 117 it is also fed through one-shot 119 to flip-flop 101 to turn off the motor start command on line 103 and turn on the motor stop command on line 121. Subsequently any sample and hold output which is outside the deadband will cause a motor start command to be issued.

An output from comparator 99 indicates that the present value on the sample and hold output line 23 is less than the previous value on the same line. Thus an indication is given that the automatic focusing is proceeding in the wrong direction and a flip-flop 123 is toggled changing the level of the signal on the motor direction command line 125 which will change the direction of focusing mirror 37 as will be detailed hereinafter. When focus gets near optimum it will begin to hunt for the optimum focus causing repeated motor direction reversals. The apparatus of the present invention for automatically ending the continual hunting near optimum focus will be discussed next.

Figure 6:
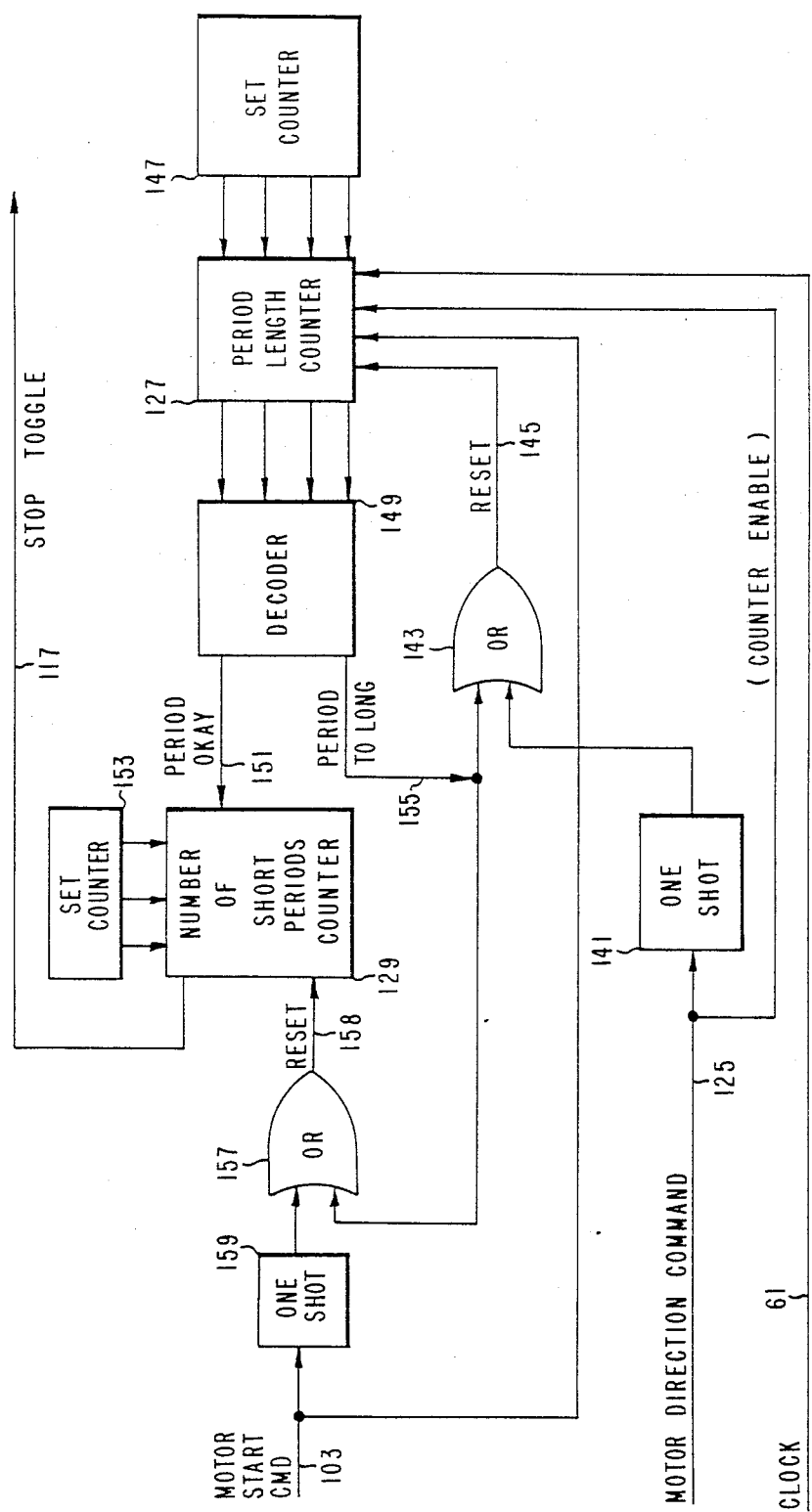
FIG. 6 is a block diagram of logic circuits used in conjunction with related circuits of FIG. 5 in the motor control logic of FIG. 1 to eliminate continuous hunting near focus.

With reference to FIG. 6, to end focus hunting, a counter 127 is clocked to count the period between reversals to assure that relatively short period reversals are occurring and a second counter 129 is used to count the number of consecutive consecutive relatively short period reversals and to issue a STOP command on line 117 when a preset number of relatively short period reversals occur. Thus when the focusing of the present invention begins to rapidly cycle back and forth around optimum focus, this condition is detected and corrected.

The counter 127 is used to assure that the cycling period is sufficiently short as to indicate hunting around optimum focus. The counter 127 is enabled when the Motor Start Command 103 generates an enabling signal as above-described during the time in which a positive signal is present on the Motor Direction Command line 125. The positive signal on line 125 generates an enabling signal through one shot 141 and a reset signal on OR gate 143 line 145.

Once enabled and after the reset caused by one-shot 141, the counter 127 counts clock pulses on line 61 until a reset signal occurs on reset line 145. The number of pulses indicative of focus hunting is preset into the counter by counter setter 147 which is implemented by toggle switches but could be programmable otherwise if desired. The number of pulses indicative of focus hunting varies from system to system being affected primarily by the time response of the various focusing mechanisms that may be employed.

A decoder 149 connected to the output of the counter 127 and outputs a signal on line 151 if the period counted by counter 127 is short enough to indicate focus hunting. The number of such outputs on line 151 is counted by the counter 129 which determines how many short period counts are needed to represent hunting. The number may be as short as three (3) and is inputted to the counter 129 by counter setter 153 which is implemented by toggle switches but could be programmable otherwise if so desired. When the preset number of short periods is counted by the counter 129 a signal is output on the STOP toggle line 117 to turn off the Motor Start Command and stop the focus hunting. If while counting short periods, a period that is too long occurs, the decoder 149 will output a signal on line 155 to reset the period length counter 127 through OR gate 143 on line 145 and the number of short periods counter 129 through OR gate 157 on line 158. Thus the STOP command on line 117 is generated only when a preset number of short periods occur consecutively.

The STOP command on line 117 turns off the Motor START command on line 103 which disables the period counter 127 and leaves the count in the counter 129 at the count which will keep the STOP command on line 117. Once a sample and hold deviation large enough occurs to set the flip-flop 101, see FIG. 5, the Motor START command signal will appear on line 103 to re-enable the counter 127 and the counter 129 will be reset through one-shot 159 and OR gate 157.

Figure 7A:
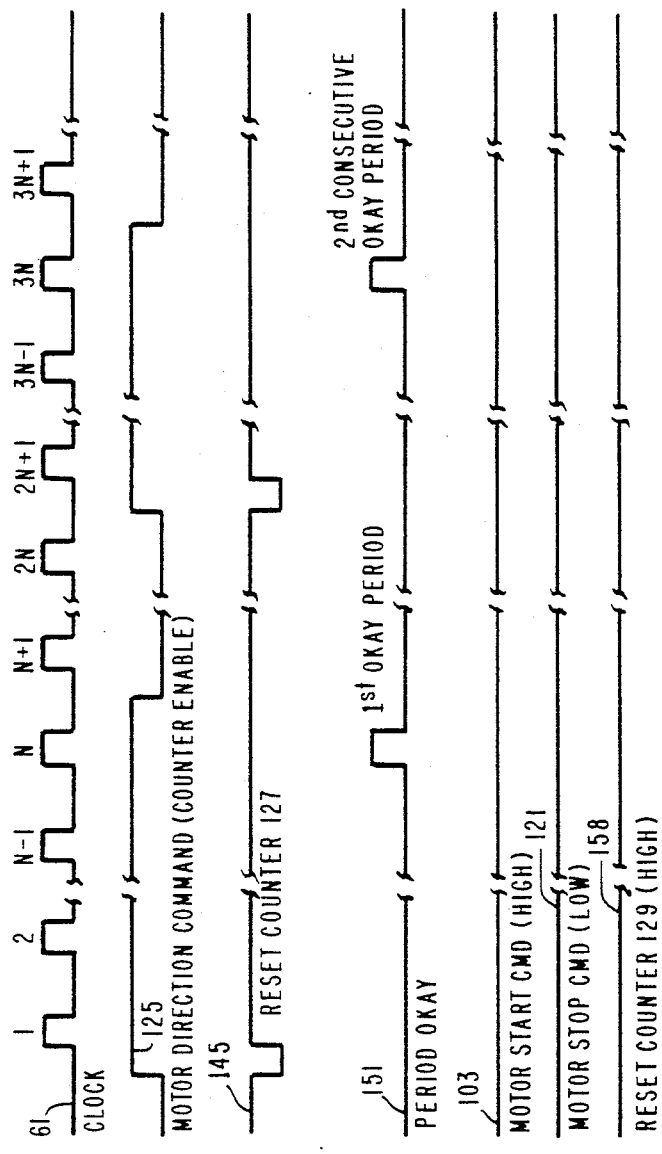
FIG. 7a is a timing diagram showing the beginning of the operation of the logic circuits of FIG. 6.
Figure 7B:
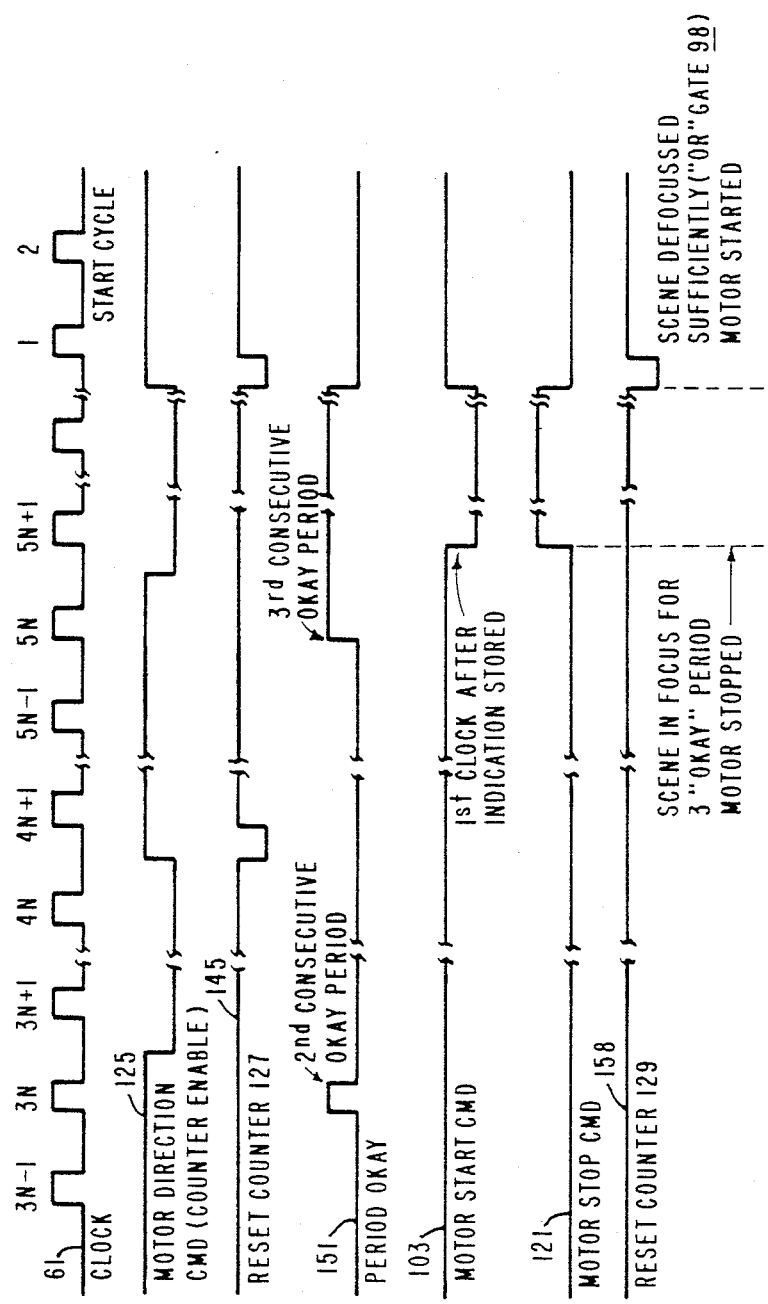
FIG. 7b is a timing diagram showing the ending of the operation of the logic circuits of FIG. 6.

The above-described operation providing focusing upon demand only and eliminating focus hunting is shown in the timing diagrams of FIGS. 7a and 7b wherein FIG. 7a shows the operation for the first 3N+1 clock pulses and FIG. 7b thereafter. With continued reference to FIGS. 5, 6, 7a and 7b, it can be seen that the motor direction command 125 is applied to one shot 141. At the beginning of each positive motor direction command OR gate 143 provides a reset counter pulse on line 145 to period length counter 127. Thereafter the period length counter 127 counts the number of pulses on clock line 61 within the positive motor direction command period and compares it to a preset desired toggle period as designated by counter setter 147. If the period is short enough then information is conveyed to short period counter 129. The purpose of the short period counter 129 is to assure that the set of Y periods contains Y consecutive periods. If a period of excessive duration (Y+M) occurs then both counters 127 and 129 are reset. This prohibits the short period counter 129 from accumulating periods which are interspersed with invalid (excessive length) periods. The the short period counter 129 reaches the desired number of consecutive sets of Y periods each, it generates a signal on the stop toggle line 117 which is supplied to the A/D converter 113 and through one shot 119 to the flip-flop 101 to stop the focusing motor 37, see FIG. 5.

With continued reference to FIG. 5, the stop toggle command on line 117 causes the A/D converter 113 to convert and to latch the last focus state from the sample and hold output line 23 for use as a future reference in deciding when to re-enable the focusing motor drive through flip-flop 101. This is accomplished by centering an acceptance band around the D/A converter 115 output and comparing subsequent sample and hold outputs on line 23 to the extremes of the band using comparators 95 and 97. If the extremes are penetrated, then the deviation from optimum focus is sufficient to require the motor stop command on line 121 to be rescinded and the counters 127 and 129 (see FIG. 6) to be re-initialized via 103 for use in deciding when the next steady-state has been achieved. At that point the focusing motor drive will again be disabled by a signal on the motor stop command line 121.

Two signals generated as described above and shown in FIG. 5; namely, the Motor Start Command 103 and the Motor Direction Control 125 are used to provide the input for the power amplifier 35 of the focusing motor 37 of FIG. 1. See FIG. 8 where the output signal on line 161 is the input to the motor power amplifier 35. The output 131 of the comparator 99 shown in FIG. 5 is fed through flip-flop 123 and a one-shot 163 to relay 165 to momentarily short out capacitor 167 of integrator 169 everytime the comparator 99 penetrates its threshold. Once the short one-shot 163 has timed out, the output 171 of the integrator 169 begins to increase exponentially in negative voltage at a rate determined by the RC time constant of resistor 179 and capacitor 167 and a constant multiplied by the amount of offset voltage generated by offset adjust potentiometer 175 connected to a positive +V supply. The constant equals the reciprocal of the product of resistor 173 and the capacitor 167. The output 171 will increase negatively in voltage at ever increasing rates due to positive feedback from inverter 177 until the integrator 169 is saturated thereby providing the motor 37 shown in FIG. 1 with a signal capable of running it slowly if it is near focus and with increasing speed if it is far from focus and requires more distance to drive into focus.

The integrator 169 also inputs to an inverter 177 which provides a positive going signal as the integrator 169 provides a negative going signal. The Motor Direction Control signal 125 generated as shown in FIG. 5 is used to control a relay 181 to select between the output of the integrator 169 and the inverter 177 so that either a positive going or negative going signal may be outputted on line 161 to the motor power amplifier 37 shown in FIG. 1.

Figure 8:
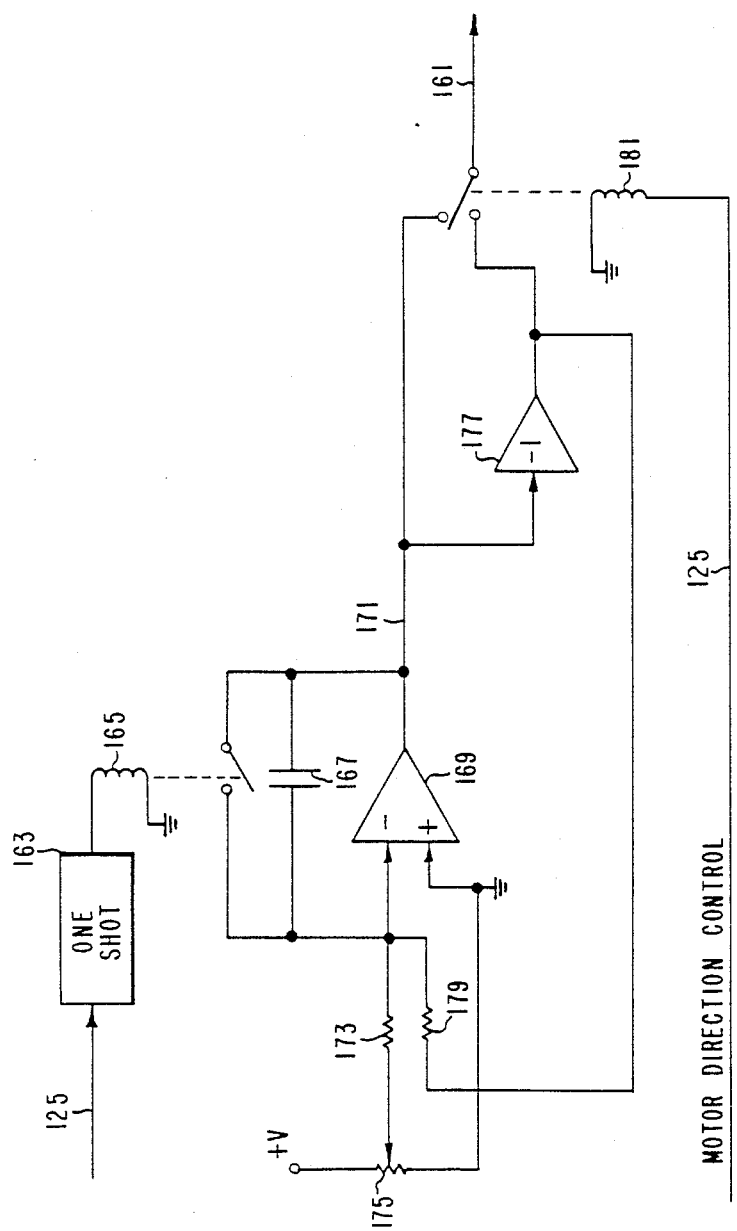
FIG. 8 is a block diagram showing circuits for use in the motor control logic to control the focusing motor used in the embodiment of FIG. 1.

The relays 165 and 181 are shown in FIG. 8 as electromechanical relays but may well be implemented as solid-state relay circuits. Further, the refinement of providing a slowly increasing level on line 161 may not be needed in all applications and a selectible positive or negative level may suffice.

The foregoing description of the preferred embodiments of the invention have been presented for purposes of illustration and description. It is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

What is claimed is:

1. A scene driven demand auto focus system for tuning a bidirectional focusing mechanism controlling the focus of a video image of a scene, said system comprising:
    deriving means for receiving sequential video images of a scene and for deriving therefrom corresponding sequential indications of the high frequency content of the video images received;
    comparing means receiving the derived indications for comparing the derived indication most recently derived with the derived indication previously derived and for generating a first drive signal if the derived indication previously derived is lower than the derived indication most recently derived by at least a certain amount and for generating a second drive signal if the derived indication previously derived is not lower than the derived indication most recently received by at least a certain amount;
    means receiving the first and second drive signal for accelerating the bidirectional focusing mechanism whenever the first drive signal is received and for reversing the direction of travel, establishing a minimum velocity and accelerating the bidirectional focusing mechanism each time the second drive signal is received whereby the bidirectional focusing mechanism is toggled and driven in the direction indicated to increase the derived indication of the high frequency content the video images received which is the direction of increased focus; and
    demand means for detecting when the bidirectional focusing mechanism is being toggled back and forth in a manner symptomatic of hunting around optimum focus and for stopping the toggling when such occurs, said demand means including restart means for comparing the derived indication of high frequency content received as the toggling is stopped with subsequently derived indications of high frequency content and for restarting the toggling whenever a subsequently derived indication differs by more than a fixed amount.

2. The scene driven auto focus system according to claim 1 wherein said deriving means derives a sequential indication of each sequence of video images received wherein the number of video images in said each sequence is selected to reduce the influence of noise upon the derived indication.

3. The scene driven auto focus system according to claim 1 wherein said deriving means includes a conditional integrator for use in deriving said sequential indications of the high frequency content of each sequence of video images received.

4. The scene driven auto focus system according to claim 2 wherein said deriving means further includes a conditional integrator for use in deriving said sequential indications of the high frequency content of each sequence of video images received.

5. The scene driven auto focus system according to claim 1 wherein said demand means includes period length counting means for registering the length of time between toggles;
    short period counting means inputted by said period length counting means, said short period counting means for counting the number of short periods between toggles; and
    reset means for resetting both said period counting means and said short period counting means each time a non-short period between toggles occurs whereby said short period counting means registers a short period count number representative of the number of consecutive short periods between toggles.

6. The scene driven demand auto focus system according to claim 5 wherein said demand means further includes means for stopping the toggling of the bidirectional focusing mechanism when said short period counter registers a predetermined count.

7. The scene driven demand auto focus system according to claim 1 wherein said demand means includes:

means for storing the last indication of the high frequency content of video images derived prior to stopping of the toggling;

means for comparing current indications of high frequency content to the last indication stored by said storing means; and means for reinstituting toggling when a current high frequency content indication deviated beyond a fixed amount from the last indication stored by said storing means.

8. The scene derived demand auto focus system according to claim 6 wherein said demand means includes:

means for storing the last indication of the high frequency content of video images derived prior to stopping of the toggling;

means for comparing current indications of high frequency content to the last indication stored by said storing means; and means for reinstituting toggling when a current high frequency content indication deviated beyond a fixed amount from the last indication stored by said storing means.

9. The scene driven demand auto focus system according to claim 1 further including means for windowing the sequential video images received by said deriving means whereby said derived indications of the sequential video images are indications of the high frequency content of only the windowed portions.

10. The scene driven demand auto focus system according to claim 8 further including means for windowing the sequential video images received by said deriving means whereby said derived indications of the sequential video images are indications of the high frequency content of only the windowed portions.

11. A scene driven demand auto focusing system adapted to replace manual tuning of a bidirectional focusing mechanism controlling the focus of a video image of a scene, said system comprising:

deriving means for receiving sequential video images of a scene and for deriving therefrom corresponding sequential indications of the high frequency content of the video image received;

comparing means receiving the derived indications for comparing the derived indication most recently derived with the derived indication previously derived and for generating a first drive signal if the derived indication previously derived is lower than the derived indication most recently derived by at least a certain amount and for generating a second drive signal if the derived indication previously derived is not lower than the derived indication most recently received by at least a certain amount;

focusing means adapted to replace manual focusing of the bidirectional focusing mechanism, said focusing means receiving the first and the second drive signal for accelerating the bidirectional focusing mechanism whenever the first drive signal is received and for reversing the direction of travel, establishing a minimum velocity and accelerating the bidirectional focusing mechanism each time the second drive signal is received whereby the bidirectional focusing mechanism is toggled and driven in the direction indicated to increase the derived indication of the high frequency content of the video images received which is the direction of increased focus; and demand means for detecting when the bidirectional focusing mechanism is being toggled back and forth in a manner symptomatic of hunting around optimum focus and for stopping the toggling when such occurs, said demands means including restart means for comparing the derived indication of high frequency content received as the toggling is stopped with subsequently derived indications of high frequency content and for restarting the toggling whenever a subsequently derived indication differs by more than a fixed amount.

12. The scene driven auto focus system according to claim 11 wherein said demand means includes:

period length counting means for registering the length of time between toggles;

short period counting means inputted by said period length counting means, said short period counting means for counting the number of short periods between toggles; and reset means for resetting both said period counting means and said short period counting means each time a non-short period between toggles occurs whereby said short period counting means registers a short period count number representative of the number of consecutive short periods between toggles.

13. The scene driven demand auto focus system according to claim 12 wherein said demand means further includes means for stopping the toggling of the bidirectional focusing mechanism when said short period counter registers a predetermined count.

14. The scene driven demand auto focus system according to claim 11 wherein said demand means includes:

means for storing the last indication of the high frequency content of video images derived prior to stopping of the toggling;

means for comparing current indications of high frequency content to the last indication stored by said storing means; and means for reinstituting toggling when a current high frequency content indication deviates beyond a fixed amount from the last indication stored by said storing means.

15. The scene driven demand auto focus system according to claim 13 wherein said demand means includes:

means for storing the last indication of the high frequency content of video images derived prior to stopping of the toggling;

means for comparing current indications of high frequency content to the last indication stored by said storing means; and means for reinstituting toggling when a current high frequency content indication deviates beyond a fixed amount from the last indication stored by said storing means.

* * * * *